United States Patent [19]
Eichweber

[11] Patent Number: 4,662,003
[45] Date of Patent: Apr. 28, 1987

[54] SYSTEM FOR ELECTROOPTICAL INFORMATION TRANSMISSION

[75] Inventor: Kurt Eichweber, Hamburg, Fed. Rep. of Germany

[73] Assignee: Precitronic Gesellschaft fur Feinmechanik und Electronic m.b.H., Fed. Rep. of Germany

[21] Appl. No.: 612,887

[22] Filed: May 22, 1984

[30] Foreign Application Priority Data

May 26, 1983 [DE] Fed. Rep. of Germany ....... 3319158

[51] Int. Cl.$^4$ ............................................. H04B 9/00
[52] U.S. Cl. ............................................. 455/605
[58] Field of Search ............... 455/605, 601, 603, 609; 345/6.5 R, 6.5 LC, 6.5 SS, 6.8 R, 6.8 LC; 340/825.54

[56] References Cited

U.S. PATENT DOCUMENTS

| | | | |
|---|---|---|---|
| 3,989,942 | 11/1976 | Waddoups | 455/605 |
| 4,107,518 | 8/1978 | McMahon | 455/601 |
| 4,143,263 | 3/1979 | Eichweber | 455/606 |
| 4,249,265 | 2/1981 | Coester | 455/605 |

*Primary Examiner*—Joseph A. Orsino, Jr.
*Attorney, Agent, or Firm*—Larson and Taylor

[57] ABSTRACT

In a system for the transmission of information between an inquiry station and a response station by means of optical radiation from the inquiry station an outgoing signal is transmitted and subjected to a modulation partially in fixed frequency and partially with information code and by the response station on the one hand is received and evaluated and on the other reflected back as return signal and subjected to a modulation. The enabling of the return reflection is controlled in dependence upon the evaluation of an identification contained in the outgoing signal. The instant of the enabling is controlled by a coding contained in the outgoing signal which indicates the end of the transmitted message, whereupon at the start of the return reflection at first an acknowledgement signal, for example an unchanged reflection of the coding of the outgoing signal, is transmitted and by said acknowledgement signal the switching of the inquiry station to fixed frequency and/or fixed coding is automatically controlled, a ready-to-answer status thus being produced. In the response station means are provided for recognizing the fixed frequency or fixed coding of the outgoing signal and for producing an operating readiness of the modulator of the response station tuned to said fixed clock frequency. An automatically controlled electromechanical diaphragm may be provided for protecting the optical system and permitting electrooptical addressability only when the inquiry code is decoded as friend signal.

5 Claims, 11 Drawing Figures

SYSTEM FOR ELECTROOPTICAL INFORMATION TRANSMISSION

DESCRIPTION

The invention relates to a system for the transmission of information between an inquiry station and a response station by means of optical radiation which is transmitted by the inquiry station as outgoing signal and subjected to a modulation partially in fixed frequency and partially with information code and by the response station on the one hand is received and evaluated and on the other reflected back as return signal and subjected to a modulation, the enabling of the return reflection being controlled in dependence upon the evaluation of a code contained in the outgoing signal.

Such a transmission system is known from U.S. Pat. No. 4,143,263.

In this known transmission system an inquiry station transmits an outgoing signal which is modulated with an information code. This modulated signal is received and evaluated by the response station. When the identification code is identical to a friend identification the return reflection is enabled. With this return reflection the outgoing signal now modulated with a fixed frequency is subjected to a modulation and reflected back to the inquiry station.

Such a system involves the problem that, for the purpose of the synchronization necessary for a correct modulation, the inquiry station and response station must be tuned to the same fixed frequency which can make decoding by the enemy easier and thus involves a risk of interception or even deception. If on the other hand the inquiry and response station are not tuned from the start to a fixed frequency there is a danger that due to lack of synchronization modulation disturbances can occur and the transmitted information thus falsified.

The invention is thus based on the problem of providing a transmission system of the type mentioned at the beginning which permits optically a safe unimitable and non-simulatable message exchange between two communication partners, one of which is initially not identified, and can initiate a coded data exchange.

This problem is solved according to the invention in a transmission system of the type mentioned at the beginning in that by a coding in the outgoing signal indicating the end of the transmitted message the instant of the enabling of the return reflection is controlled, that at the start of the return reflection firstly an acknowledgement signal is transmitted, for example an unchanged reflection of the coding of the outgoing signal, that by the acknowledgement signal the switching of the inquiry station to fixed frequency and/or fixed coding of the outgoing signal is controlled and that at the response station means are provided for recognizing the fixed frequency or fixed coding of the outgoing signal and for producing an operating readiness of the modulator tuned to said fixed clock frequency.

Advantageously, the inquiry station and response station are configured in similar manner to permit alternate operation with information transmission free from interference and non-simulatable.

This solution according to the invention has the advantage that the inquiry station can select more or less any fixed frequency or fixed coding for the outgoing signal, considerably increasing security as regards monitoring and simulation, without any risk of this endangering a synchronized modulation of the outgoing signal for the reflection back to the inquiry station.

The invention will be explained in detail hereinafter with reference to a preferred embodiment with the aid of the Figures, wherein.

The transmission system consists of a transmitter 1 as inquiry station S and a response station E comprising a receiving and reflection-back system 3.

Figure 1:
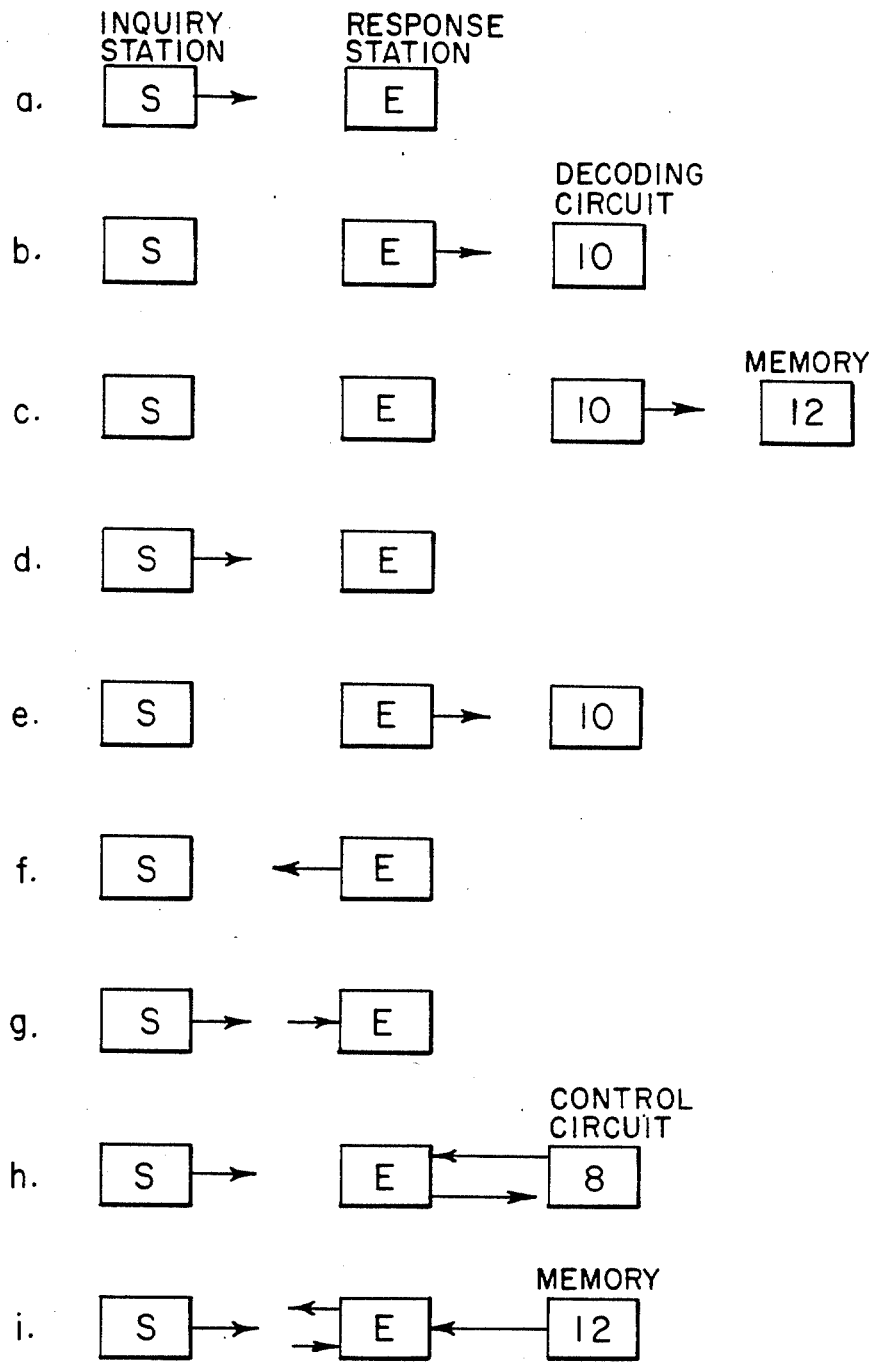
FIGS. 1a to 1i show the individual method stages of the system according to the invention.

At the start of the transmission operation the inquiry station S transmits a coded optical or light signal and directs the latter onto an as yet unidentified cooperative target, i.e. the response station E (FIG. 1a). This coded signal is generated by a laser 2 and directed via an optical system 4 onto a sensor 6 of the response station.

At the target the signals of the inquiry station are received by the sensor 6 (FIG. 2) and amplified by the control circuit 8 connected thereto and decoded in a decoding circuit 10 contained in said control circuit 8 (FIG. 1b).

Thereafter the information or communications content of the signals is passed onto a memory 12 contained in the control circuit 8 and stored therein or passed onto another suitable station (FIG. 1c). At the end of the transmission from the inquiry station to the response station the inquiry station S transmits a coding to indicate that the inquiry message is terminated (FIG. 1d). This end coding is received by the response station E (FIG. 1e) and passed onto the decoding circuit 10. When this coding is identical to a key code stored in the response station E a return reflector 14, for example a triple mirror, is enabled and/or aligned with the inquiry station. The last portion of the inquiry signals is thereby reflected back as "acknowledgement" by the response station to the inquiry station (FIG. 1f). This acknowledgement signal is conducted via a beam splitter 18 in the inquiry station S to a receiver with associated decoder which on reception of the acknowledgement switches the inquiry system S to a fixed frequency or a fixed coding (FIG. 1g) and maintains this fixed coding for the duration of the information transmission. The response station receives the fixed-coded signal and passes it on to the control circuit 8 which on recognizing the fixed coding sets the modulator 16 to a state of readiness tuned to said fixed clock frequency (FIG. 1h). In the further course of the information exchange between inquiry and response stations the fixed-coded signal transmitted by the inquiry station is modulated with data which are taken from a memory 12 or another suitable data generator and this fixed-coded signal modulated with the data is reflected back to the inquiry station. These data may be generated by a gyro compass, a bearing dioopter and/or a range finder or other external peripheral devices and passed onto the control circuit 8.

Figure 2:
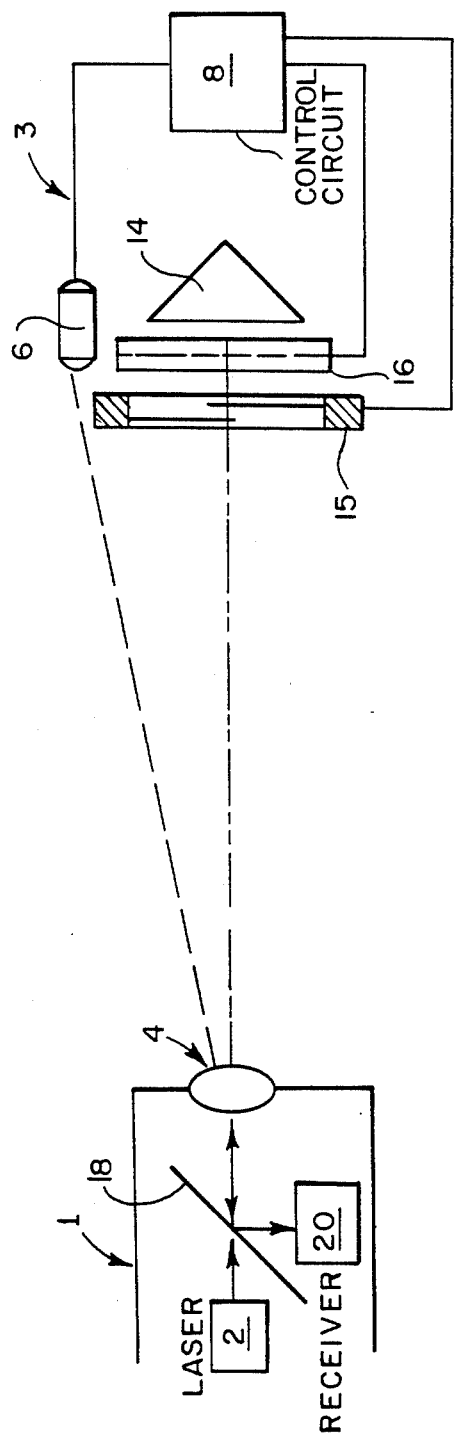
FIG. 2 shows a possible embodiment of the system according to the invention.

FIG. 2 illustrates a preferred embodiment of the transmission system.

The laser 2 of the inquiry station 1 transmits its coded optical or light signal through a beam splitter 18, e.g. a semitransparent mirror, via an optical transmission system 4 in the direction towards the response station, i.e. the receiver 3. This radiation is preferably transmitted with the widest possible transmission lobe in order to be certain of covering the interrogated target E or the communication partner.

At the response station the irradiated coded signal is received by a photoelectric sensor 6 which is constructed as photodiode or, if high sensitivity or switching speeds are desired, for example as avalanche photodiode. The output signal of said sensor is supplied to a control circuit 8 which contains the usual necessary circuit elements such as discriminators, decoders 10, memories 12, and the like.

In dependence upon the information contained in the received signal the control circuit 8 controls a modulator 16 which precedes the triple mirror 14 in such a manner that it is in the path of the signal to be reflected from the inquiry station 1. Said modulator 16 is of a type known per se, i.e. its light permeability is altered for example by applying an electrical signal.

However, the light permeability can also be varied in suitable manner by other physical effects, for example by varying the refractive index by means of acoustic waves.

Said modulator can serve both for modulation of the return reflected signal as well as optical permanent shutter as long as the transmission system is out of operation.

Alternatively, the triple mirror may also be stopped down by a flap or similar means which are not removed from the light path until the inquiry station has transmitted a suitable identification.

In FIG. 2 for example there is disposed in front of the modulator as shutter element an iris diaphragm 15 controllable by the control circuit via an amplifier.

The signals reflected back are received with the information modulated thereon by the inquiry station again via the optical system 4 and thereupon conducted through the beam splitter 18 to a suitable receiver 20 which filters the modulated-on information from the fixed-coded signal and either stores it or evaluates it.

Advantageously, the inquiry station and response station may be equipped in complementary or identical manner so that both can operate as transmitting or receiving station 1 or 2. For this purpose the inquiry station 1 of FIG. 2 could contain instead of the receiver 20 a circuit of the type in the response station 3 of FIG. 2 and the response station identically equipped.

Figure 3:
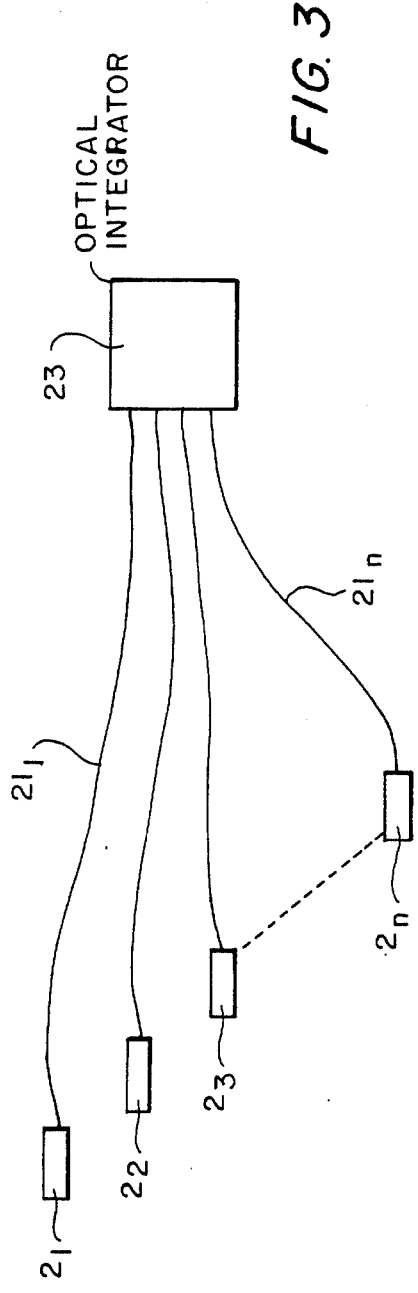
FIG. 3 shows an advantageous embodiment of the transmitter-side laser.

FIG. 3 shows a particularly advantageous further development of the laser 2 of the inquiry station 1 of FIG. 2. Said laser consists of individual lasers $2_1, 2_2, 2_3 \ldots 2_n$ which are coupled out in a manner known per se via optical fibres $21_1 \ldots 21_n$ and combined or integrated by an optical integrator 23, for example a glass body.

Such an arrangement is advantageous for the invention because laser diodes in continuous operation cannot normally be operated at full output power but can emit for example 5-10 watts for a short time. With such a power a distance of several kilometers can be covered with a width of the transmission lobe of ½-1 mrad.

According to the invention to increase the pulse repetition frequency the laser diodes $2_1, 2_2, 2_3 \ldots 2_n$ are not all driven at the same time but sequentially in groups in succession. These concentrated output signals of the interrogation lasers $2_1$-$2_n$ pulsed in groups are coupled over each other by the optical integrator in such a manner that for the response station they form a point source for the optical radiation, i.e. the signal bursts transmitted by the inquiry station 1 illuminate the response station homogeneously.

With this further development of the inquiry laser according to the invention higher pulse rates than 30 KHz are made possible and these have an energy content high enough to bridge relatively large distances.

The individual lasers of this laser group may for example be GaAs diodes which can each provide about 10 watts power for example 5-10 KHz with typically 30-100 nanoseconds pulse width.

I claim:
1. A system for the transmission of information between an inquiry station and a response station,
   wherein the inquiry station includes an optical radiation means for transmitting an outgoing signal and for subjecting this outgoing signal to a modulation in fixed pulse rate and at a separate time with an information code, the optical radiation means also coding the outgoing signal with an indication of an end of a transmitted message,
   wherein the response station includes a means for receiving and evaluating the outgoing signal, a means for subjecting to a modulation and reflecting back the outgoing signal as a return signal, and an enabling means for controlling an enablement of the reflecting back means in-dependance on an evaluation by said receiving and evaluating means of the indication of the end of the transmitted message contained in the outgoing signal,
   characterized in that
   (a) an initiation of said enabling means is controlled by the evaluating of the indication of the end of the transmitted signal by said receiving and evaluating means,
   (b) at the initiation of the return reflection, an acknowledgement signal is transmitted by said reflecting back means of said response station,
   (c) by use of the acknowledgement signal, a control means for switching said radiation means of the inquiry station to at least one of a fixed pulse rate and a fixed coding of the outgoing signal is controlled, and
   (d) at the response station, said receiving and evaluating means includes a means for recognizing the at least one of the fixed pulse rate and the fixed coding of the outgoing signal and for actuating a modulator tuned to a fixed pulse rate in order to appropriately modulate the return signal produced by said reflecting back means.

2. System according to claim 1 wherein said acknowledgement signal is an unchanged reflection of the end of a transmitted message coding of the outgoing signal.

3. System according to claim 2 wherein said optical radiation means includes a plurality of laser diodes in which each laser diode ($2_1$-$2_n$) is connected to one end of an optical fibre $21_1$-$21_n$) whose other end is combined to form an optically homogeneous integrator body (23) characterized in that to increase the pulse repetition rate the individual laser diodes are not all driven simultaneously but rather sequentially in discrete groups of at least one said laser diode, and which groups are driven in succession.

4. System according to claim 2, characterized in that the inquiry station includes a response station and the response station includes an inquiry station such that an information exchange in both directions is possible in the manner of alternate operation.

5. System according to claim 4 wherein said optical radiation means includes a plurality of laser diodes in which each laser diode ($2_1$-$2_n$) is connected to one end of an optical fibre ($21_1$-$21_n$) whose other end is combined to form an optically homogeneous integrator body (23) characterized in that to increase the pulse repetition rate the individual laser diodes are not all driven simultaenously but rather sequentially in discrete groups of at least one, and which groups are driven in succession.

* * * * *